United States Patent Office 2,853,372
Patented Sept. 23, 1958

2,853,372

COMPOSITION AND PROCESS FOR THE CONTROLLED ETCHING OF ALUMINUM AND ALUMINUM ALLOYS

Louis McDonald, Altadena, and Dariel E. Miller, Glendale, Calif., assignors to Kelite Products, Inc., Los Angeles, Calif., a corporation of California No Drawing. Application November 22, 1954
Serial No. 470,535

6 Claims. (Cl. 41—42)

This invention relates to a composition and process for the controlled etching of aluminum; and more specifically, it relates to composition and process which is used for imparting an etched surface which is desired for decorative processes, or for the preparation of aluminum for anodizing or conversion coating treatment. The invention is also useful for etching aluminum plates for the preparation of printing and illustrative matter in the graphic arts industry.

A further purpose of the invention is the selective etching of unwanted regions of the metal and reverse metal forming process in the manufacturing of articles or parts that normally would have to be made by machining with machine tools, such as milling machines, shapers, profiling machines and lathes.

The etching of aluminum for the above purposes is an established art. It is customary to employ solutions embodying sodium hydroxide or similarly highly alkaline materials at temperatures in the region of 160° F. for imparting an etched surface for decorative purposes or to prepare aluminum for anodizing or application of conversion coatings. The entire part is immersed in the alkaline bath for the proper cycle interval required to impart the desired etch, removed, rinsed in water, rinsed in acid solution such as nitric acid and finally rinsed in water. In the preparation of plates for graphic arts use, a negative image is formed on the plate by employing the conventional initial steps of a photoengraving process. The plate is then immersed in the etch bath and the unprotected and unmasked parts of the aluminum are etched away. In the reverse metal forming process the areas of metal which are to be preserved are protected by masking by overprinting with resin base inks, masked with chemically resistant tapes or masked by spraying with polymeric substances which form chemically resistant films. The part is then immersed in the hot etchant bath for a cycle interval required to remove the unwanted metal.

The reaction which takes place to etch the surface and/or remove the unwanted regions of aluminum metal essentially comprise the replacement of hydrogen by aluminum from an alkali hydroxide. Hydrogen is liberated as gas and the salt, sodium meta-aluminate is formed. After a finite level of concentration of sodium meta-aluminate is formed in the bath and the use of the bath is continued, the sodium meta-aluminate decomposes to form sodium hydroxide and aluminum oxide. The latter reaction product separates as an insoluble precipitate. (Smith's Inorganic Chemistry, D. Appleton Century Co., pp. 771–772, 1922.)

The problem of controlling the rock-like precipitate of aluminum oxide was encountered early in the production of aluminum oxide from bauxite for the electrolytic production of aluminum metal. The process used was the Bayer Process. (Industrial Chemistry, Reigel, 3d edition, 1937, page 302.)

Aluminum oxide was formed by reacting bauxite with a solution of sodium hydroxide to form a solution of sodium meta-aluminate. The resulting solution of sodium meta-aluminate was filtered thereby separating the bauxite impurities, such as iron and silica which were not dissolved by sodium hydroxide. To prevent the conversion of sodium meta-aluminate to insoluble aluminum oxide prior to filtration, starch was used as a conversion inhibitor. It was discovered that the decomposition of sodium meta-aluminate to aluminum oxide and sodium hydroxide could be prevented with starch. This made it possible to produce pure aluminum oxide from lower grade bauxite ores which were not considered useable at the time of the initiation of the Hall Process for producing aluminum in 1889.

Conversion inhibitors have been long used in processes and compositions for etching aluminum. In addition to starch, other conversion inhibitors have been well known, such as hydroxy carboxylic acids, gluconic acids, polyhydroxy alcohols, sugars, gums etc.

It is a general object of the present invention to provide a process and composition for the controlled etching of aluminum and aluminum alloys which embodies the employment of a new type conversion inhibiting agent, which new type of conversion inhibiting agent offers advantages over those heretofore employed.

It has now been discovered that certain alkyl substituted aryl sulfonic acid compounds can be most advantageously employed in alkaline baths to provide controlled etching and/or reverse forming of aluminum metals and aluminum alloys. These compounds can be used alone with caustic alkalies or with mixtures of caustic alkalies and certain carbohydrates such as starch. These compounds fall into two general classes showing generic formulae as follows:

(a)

wherein R is a naphthalene ring, X is a member of the group consisting of sulfonic acid and salts thereof, $r_1$ is an aliphatic group having no more than 5 carbon atoms and $n$ is an integer not more than 2, and $r_2$ is selected from the group consisting of hydrogen, methyl, and ethyl. Di-isobutyl methylnaphthalene sodium sulfonate is a typical example of this class. Others are di-isopropyl naphthalene sodium sulfonate and di-isobutyl naphthalene sodium sulfonate.

(b)  

wherein R is a naphthalene ring, X is a member of the group consisting of sulfonic acid and salts thereof, and $y$ is an integer from 1 to 6. Compounds within this class are polymeric naphthalene methylene sulfonates. Typical of this class is polymeric naphthalene tetra methylene sodium sulfonate which is formed by sulfonating naphthalene with a strong sulfonating acid, diluting with water and adding methylene groups by reaction with formaldehyde. Then formaldehyde in the presence of free sulfuric acid initiates polymerization.

The process and composition of the present invention will be more completely understood from the following description of the preferred examples of the invention.

The composition of the present invention consists essentially of caustic soda and an alkyl aryl sulfonate within the two classes described. The least amount of alkyl aryl sulfonate found effective is 0.025% and we have used up to slightly in excess of 20%. In the solid composition the caustic varies from 15% to 99.75%. It is possible in this invention to substitute as equivalents some phosphates for part of the caustic soda. For the purposes of economy, it may be preferable to use starch as part of the conversion inhibitor. Starch is considerably cheaper than the alkyl aryl sulfonate and so by substitution of starch for part of alkyl aryl sulfonate economies are effected. Thus in the solid composition, starch may comprise from zero to 20%. It is likewise advantageous to include sodium sulfate in the composition. By the addition of sodium sulfate to the solid composition one not only obtains an advantage in inhibiting the solid composition caking but in the conversion bath sodium sulfate operates as an agent for preventing the caustic embrittlement of iron. The sodium sulfate may be employed in the parts from zero to 50% of the solid mixture.

In practice of the present invention the solid constituents are dissolved to form an aqueous bath which should contain from 1% to a maximum of 5% caustic soda and the resulting aqueous bath is employed for etching aluminum generally around temperatures of between 160 and 220° F.

The advantages of the use of the alkyl aryl sodium sulfonates described in an aluminum etch bath is illustrated by the results of tests as shown in the attached tables. In Table I there is illustrated the comparative action of three different solutions in etching aluminum, the solid constituents of one solution consisting of 10% starch and 90% caustic soda. The solid constituents of the second solution consisted of 20% di-isobutyl methyl naphthalene sulfonate at 80% caustic soda, and the solid constituents of the third solution consists solely of caustic soda. From this tabulation it will appear that using caustic soda alone it is possible to dissolve only 4.8 lbs. of aluminum before a hard scale is formed and deposited on the heating tubes and the walls of the etching tank. By the addition of starch (as in the well-known process of reacting bauxite) it is possible to continue the test for a period of 9 days dissolving 29.6 lbs. of aluminum before a hard scale is produced thus illustrating the value of starch as an inhibitor of conversion of sodium meta-aluminate to the insoluble aluminum oxide. By the use, however, of the alkyl aryl sulfonate of the present invention, i. e. in this example di-isobutyl methyl naphthalene sulfonate, it is possible to continue the reaction to a total of 59.5 lbs. of aluminum is dissolved, at which time the scale formation is very slight and moreover such solution is more effective in etching aluminum as evidenced by the fact that aluminum is etched at the rate of 6.6 lbs. per day as compared with the 4.4 lbs. per day using the other solutions.

It is also of significant importance that the etching bath using the alkyl aryl sodium sulfonate was actually of lower caustic content than the other etching bath tested as reported in Table I.

*Table I*

[Composition: Lbs. composition added/day; lbs. Al etched/hr.; lbs. Al etched/day. Starting with 5% solution in a bath of 22 gal.—180° F.]

| Composition, weight, percent | Lbs. composition added/day | Lbs. Al etched/hr. | Lbs. Al etched/day | Time of test in days | Total lbs. Al dis. | Remarks |
|---|---|---|---|---|---|---|
| 10 starch<br>90 NaOH | 6 | 0.66 | 4.40 | 9.00 | 39.6 | Hard scale formed. |
| 20 di-isobutyl methyl naphthalene sulfonate<br>80 NaOH | 6 | 0.66 | 6.69 | 9.00 | 59.5 | Slight scale started to form. |
| 100 NaOH | 6 | 0.66 | 4.40 | 1.1 | 4.8 | Heavy scale formed. |

In Table II, there is illustrated the behavior of three examples of the present invention wherein the etch control agents are an admixture of starch and different specific alkyl aryl sulfonates.

*Table II*

| Materials in lbs. | Formula I | Formula II | Formula III |
|---|---|---|---|
| Sodium hydroxide | 300 | 300 | 300 |
| Starch | 25 | 25 | 25 |
| Di-isobutyl methyl naphthalene sodium sulfonate | 2.5 | | |
| Di-isopropyl naphthalene sodium sulfonate | | 2.5 | |
| Di-isobutyl naphthalene sodium sulfonate | | | 2.5 |

A solution comprised of 50 lbs. of etchant composition in 250 gallons of water was used.

Results showing the behavior of each of the etch control agents are disclosed in the following table:

[Weight aluminum dissolved in alkaline etch baths containing various etch control agents as a function of time of treatment at 180° F.]

| | Formula I | | Formula II | | Formula III | |
|---|---|---|---|---|---|---|
| | Wt. lbs. Al loss | Wt. lbs. etchant added | Wt. lbs. Al loss | Wt. lbs. etchant added | Wt. lbs. Al loss | Wt. lbs. etchant added |
| 1½ hrs | 7.6 | | 8.2 | | 9.2 | |
| Do | 6.9 | | 7.6 | | 8.6 | |
| Do | 10.0 | | 7.8 | | 7.5 | |
| Do | 5.2 | | 7.6 | | 8.3 | |
| Total 6 hrs | 29.7 | 125 | 31.2 | 125 | 33.6 | 125 |
| 1½ hrs | 5.1 | | 6.0 | | 5.3 | |
| Do | 10.5 | | 7.8 | | 8.0 | |
| Do | 9.2 | | 6.1 | | 6.7 | |
| Do | 7.7 | | 5.7 | | 4.9 | |
| Total 6 hrs | 32.5 | 100 | 25.6 | 50 | 24.9 | 50 |
| 1½ hrs | 4.7 | | 4.2 | | 5.5 | |
| Do | 3.9 | | 8.8 | | 6.0 | |
| Do | 6.0 | | 3.7 | | 10.3 | |
| Do | 4.9 | | 4.8 | | 8.0 | |
| Total 6 hrs | 19.5 | | 21.5 | 100 | 29.8 | 100 |
| 1½ hrs | 3.1 | | 8.6 | | 10.6 | |
| Do | 5.4 | | 5.2 | | 7.1 | |
| Do | 4.6 | | 6.5 | | 6.4 | |
| Do | | | 8.6 | | 12.2 | |
| Total 6 hrs | 13.1 | 50 | 28.9 | 50 | 27.3 | None |

|  | Formula I | Formula II | Formula III |
|---|---|---|---|
| 4 day Al dissolved | 94.8 lbs | 107.2 lbs | 115.6 lbs. |
| Immersion time | 22½ hrs | 24 hrs | 24 hrs. |
| Total material | 250 lbs | 325 lbs | 275 lbs. |
| Cond. of tank on sides | Heavy white sludge. Washes out clean. | Perfect, no deposit. Heavy soft sludge. | Soft deposit on sides. Heavy soft sludge. |

While the preceding examples of the present invention are well adapted to carry out the objects of the invention, various modifications may be made and this invention is of a scope set forth in the appended claims.

We claim:

1. In a process of etching aluminum and aluminum alloys the step, comprising: treating the surface to be etched with a hot aqueous solution of an etching alkali containing a small amount of a lower alkyl naphthalene sulfonate selected from the class consisting of (a) compounds having the general formula

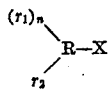

wherein R is a naphthalene ring, X is a member of the group consisting of sulfonic acid and salts thereof, $r_1$ is an aliphatic group having at least 1 carbon atom but no more than 5 carbon atoms and $n$ is an integer not more than 2, and $r_2$ is selected from the group consisting of hydrogen, methyl, and ethyl, and (b) polymeric naphthalene methylene sulfonates having the general formula $$X-R-(CH_2-R-X)_y$$

wherein R is a naphthalene ring, X is a member of the group consisting of sulfonic acid and salts thereof, and $y$ is an integer from 1 to 6.

2. The process as defined in claim 1 wherein the lower alkyl naphthalene sulfonate is selected from the group consisting of di-isobutyl methylnaphthalene sodium sulfonate, di-isopropyl naphthalene sodium sulfonate, di-isobutyl naphthalene sodium sulfonate, and polymeric naphthalene tetramethylene sodium sulfonate.

3. The process as defined in claim 1 wherein the non-aqueous constituents of said aqueous-treating solution comprise from about 15% to 99.75% of caustic soda and from about 0.025% to 20% of lower alkyl naphthalene sulfonate.

4. The process as defined in claim 1 wherein the non-aqueous constituents of the aqueous-treating solution comprise from 15% to 99.75% caustic soda, from 0.025% to 20% lower alkyl naphthalene sulfonate, and up to about 20% of starch.

5. A composition for the controlled etching of aluminum and aluminum alloys: said composition consisting essentially of caustic soda, starch, and a lower alkyl naphthalene sulfonate as the active constituents thereof, the lower alkyl naphthalene sulfonate being selected from the class consisting of (a) compounds having the general formula

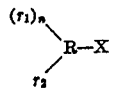

wherein R is a naphthalene ring, X is a member of the group consisting of sulfonic acid and salts thereof, $r_1$ is an aliphatic group having at least 1 carbon atom but no more than 5 carbon atoms and $n$ is an integer not more than 2, and $r_2$ is selected from the group consisting of hydrogen, methyl, and ethyl, and (b) polymeric naphthalene methylene sulfonates having the general formula $$X-R-(CH_2-R-X)_y$$

wherein R is a naphthalene ring, X is a member of the group consisting of sulfonic acid and salts thereof, and $y$ is an integer from 1 to 6.

6. A composition as defined in claim 5 wherein the lower alkyl naphthalene sulfonate is selected from the group consisting of di-isobutyl methylnaphthalene sodium sulfonate, di-isopropyl naphthalene sodium sulfonate, di-isobutyl naphthalene sodium sulfonate, and polymeric naphthalene tetramethylene sodium sulfonate.

References Cited in the file of this patent

UNITED STATES PATENTS

| 2,650,875 | Dvorkovitz | Sept. 1, 1953 |
| 2,653,860 | Meyer | Sept. 29, 1953 |
| 2,674,523 | McDonald et al. | Apr. 6, 1954 |
| 2,741,051 | Reissig | Apr. 10, 1956 |

OTHER REFERENCES

Prescott et al.: Metal Finishing, October 1953, pages 65 to 67.

Harris: Trend in Aluminum Cleaning, Aluminum and Mag. Magazine, April 1945.